(12) United States Patent
Chao et al.

(10) Patent No.: US 9,303,617 B2
(45) Date of Patent: Apr. 5, 2016

(54) WAVE ENERGY GATHERING AND ENHANCING DEVICE UTILIZING LINEARIZED SHALLOW WATER WAVE THEORY

(71) Applicant: NATIONAL TAIWAN UNIVERSITY, Taipei (TW)

(72) Inventors: Sheng Der Chao, Taipei (TW); Shuo Feng Chiu, Taipei (TW); Yao Hung Huang, Taipei (TW); Chun Chieh Wang, Taipei (TW); Ssu Che Wang, Taipei (TW); Chin-Chou Chu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 429 days.

(21) Appl. No.: 13/933,187

(22) Filed: Jul. 2, 2013

(65) Prior Publication Data
US 2014/0300110 A1    Oct. 9, 2014

(30) Foreign Application Priority Data

Apr. 8, 2013 (TW) .............................. 102112313 A (51) Int. Cl.
*E02B 9/08* (2006.01)
*E02B 3/04* (2006.01)
*F03B 13/14* (2006.01)

(52) U.S. Cl.
CPC . *F03B 13/14* (2013.01); *E02B 3/04* (2013.01); *E02B 9/08* (2013.01); *F05B 2240/10* (2013.01); *Y02E 10/38* (2013.01)

(58) Field of Classification Search
CPC ....... Y02E 10/38; F03B 13/08; F03B 13/105; F03B 13/14–13/147; F03B 15/02; E02B 3/04; E02B 3/06; E02B 3/062; E02B 9/08

USPC ........ 405/21, 25, 30–35, 76–79; 60/495–507; 290/42, 43, 53, 54

See application file for complete search history.

(56) References Cited

U.S. PATENT DOCUMENTS

| | | | | |
|---|---|---|---|---|
| 4,255,066 A | * | 3/1981 | Mehlum | E02B 3/062 405/35 |
| 5,558,460 A | * | 9/1996 | Jenkins | E02B 3/127 405/16 |
| 2008/0050178 A1 | * | 2/2008 | Erlingsson | E02B 3/06 405/21 |
| 2009/0175685 A1 | * | 7/2009 | Bowers | E02B 1/003 405/52 |
| 2014/0260236 A1 | * | 9/2014 | Barker | F03B 13/16 60/497 |

* cited by examiner

*Primary Examiner* — Jesse Bogue
*Assistant Examiner* — Laert Dounis
(74) *Attorney, Agent, or Firm* — Li & Cai Intellectual Property (USA) Office (57) ABSTRACT

The present disclosure provides a wave energy gathering and enhancing device disposed in a setting area of the sea-bed. A seawater wave approaches the wave energy gathering and enhancing device with a wave vector. The wave energy gathering and enhancing device comprises a plurality of structures. The plurality of structures are arranged below the sea surface in a two-dimensional symmetric discrete group. Each of the structures has a top surface and the top surface is located below the sea surface with a predetermined depth. A lattice with a definite lattice constant is formed by the plurality of structures. The lattice plane formed by the structures and the wave vector of the seawater wave form an angle. The structures enhance the amplitude of the seawater wave when the seawater wave interacts with and passes through the structures.

6 Claims, 6 Drawing Sheets

WAVE ENERGY GATHERING AND ENHANCING DEVICE UTILIZING LINEARIZED SHALLOW WATER WAVE THEORY

BACKGROUND OF THE INVENTION

1. Field of the Invention

The instant disclosure relates to the technology of wave energy development and utilization; in particular, to a wave energy gathering and enhancing device utilizing linearized shallow water wave theory.

2. Description of Related Art

Figure 1A:
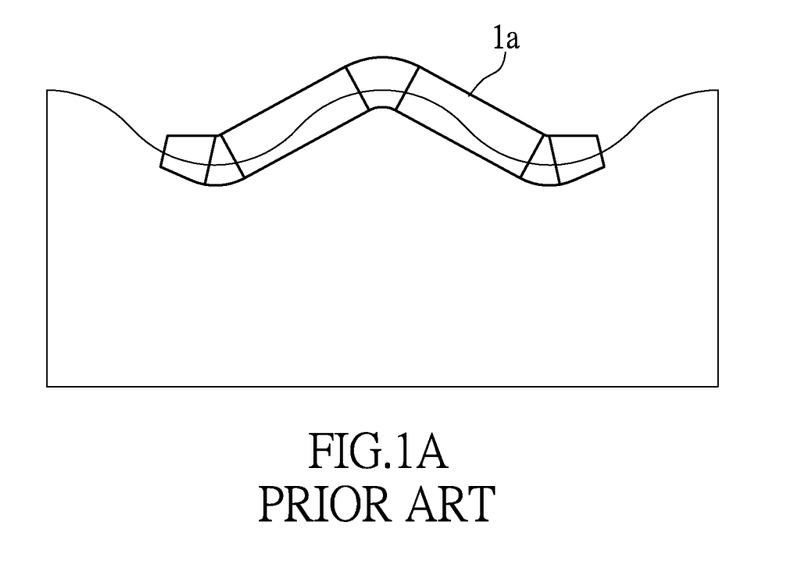
FIG. 1A shows a schematic diagram of a conventional wave energy converting device converting potential energy to kinetic energy.
Figure 1B:
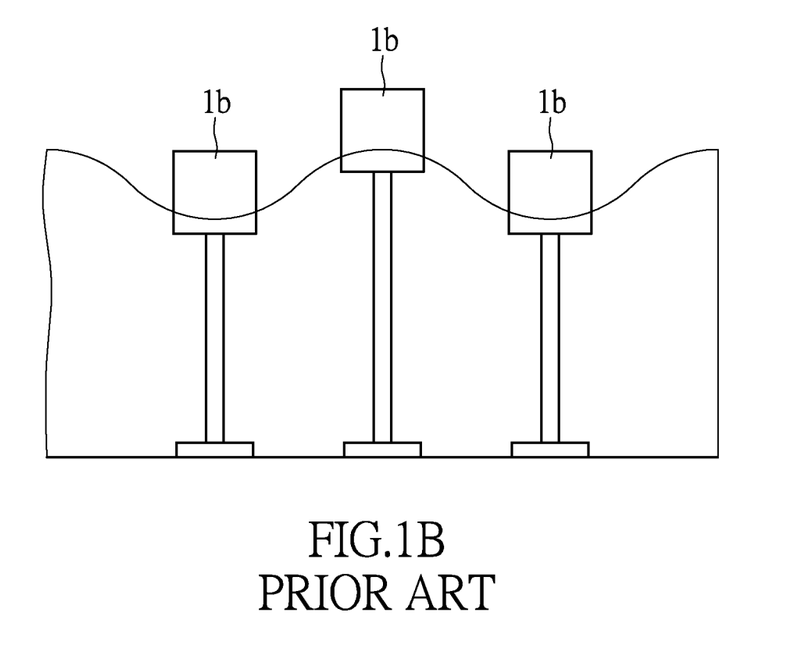
FIG. 1B shows a schematic diagram of a conventional wave energy converting device converting potential energy to kinetic energy.

Wave power generation has been gradually promoted, but most applications are for small-scale power generation. FIG. 1A and FIG. 1B show schematic diagrams of conventional wave energy converting devices converting potential energy to kinetic energy. The wave energy converting device 1a shown in FIG. 1A is a wave attenuator. The wave energy converting device 1b shown in FIG. 1B is a point absorber. The wave energy converting devices 1a and 1b both convert the potential energy change of undulation of the sea waves to kinetic energy, then change the kinetic energy to electric energy. When the amplitude of the sea wave is enhanced, the converted energy of the wave energy converting devices 1a and 1b is increased accordingly.

For now, the economic benefit of large-scale wave power generation is still not competitive comparing to conventional energy generation, thus the wave power generation has not been widely employed. Besides, not all sea area is adequate to carry out wave power generation, especially in the congenital conditions unfavorable for electric power generation, such as dispersion of wave energy, low energy density, or affection of the natural environment.

SUMMARY OF THE INVENTION

The object of the instant disclosure is to offer a wave energy gathering and enhancing device. The device is disposed below the sea surface in the distribution of a two-dimensional discrete symmetry group for enhancing the amplitude of the sea waves, so as to increase the generated energy of wave power generation.

The instant disclosure provides a wave energy gathering and enhancing mechanism for the congenital conditions unfavorable for electric power generation, such as dispersion of wave energy, low energy density, or affection of the natural environment. According to this mechanism, the well-distributed wave energy could be concentrated to a specific sea area for gathering energy. The amplitude of the sea wave can be enhanced and the energy density can be increased, thus the quality of power generation could be important accordingly. The region of the specific area for gathering energy could be determined with the installation of the device disclosed in the instant disclosure. Therefore, comparing to disadvantages that sea area with abundant wave resource is usually far away from electricity customers and not convenient for management and construction of power generation management system, the wave energy gathering and enhancing device of the instant disclosure is more competitive in the energy market.

In order to achieve the aforementioned objects, according to an embodiment of the instant disclosure, a wave energy gathering and enhancing device is offered. The device is disposed in a setting area of the sea-bed, and a seawater wave approaches the wave energy gathering and enhancing device with a wave vector. The wave energy gathering and enhancing device comprises a plurality of structures arranged below the sea surface in a two-dimensional symmetric discrete group. Each of the structures has a top surface located below the sea surface with a predetermined depth. A lattice with a definite lattice constant is formed by the plurality of structures. A lattice plane formed by the structures and the wave vector of the seawater wave form an angle. The structures enhance the amplitude of the seawater wave above the structures when the seawater wave interacts with and passes through the structures.

In summary, a wave energy gathering and enhancing device is offered in the instant disclosure. The device of the instant disclosure mainly stores the wave potential energy to obtain more generated electric energy, and increases the energy density of the wave in the energy collection area. The device could be easily integrated with the conventional energy converting system, and it does not need to change the settings of the existing power generating units.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

At present, the wave power generation is in the research and testing phases which mostly put emphasis on the energy conversion efficiency of the back-end electric power generator sets. The bottleneck encountered is that conditions of use are limited to areas of ocean with high average wave energy density or only small-scale power generation could be carried out. Oppositely, there is less research for enhancing the wave energy within front-end wave gathering technique which reduces wave energy technology development threshold.

The technique of the instant disclosure belongs to front-end wave energy collecting system. Before the wave energy enters the energy converting system, the device of instant disclosure could be utilized to increase the energy flux density of the incident wave. The wave energy could be provided for electric power generation of the back-end generator sets by power gathering method. The collecting of the wave energy is made by converting potential energy to kinetic energy. The device of the instant disclosure mainly stores wave potential energy to obtain higher electric power generation. By the manner of increasing the density of wave energy in the energy collecting area, the device of instant disclosure could be easily integrated with conventional energy converting systems (for example, cooperating with the wave energy converting device 1a and 1b). There is no need to modify the configuration of exist electric power generating sets.

The wave energy gathering and enhancing device of the instant disclosure comprises a group of structures disposed on the seabed. A plurality of structures could be built on the seabed in a periodic arrangement (will be described in detail). The plurality of periodically arranged structures and the sea water form a non-uniform media. According to a linearized shallow water wave equation (will be described later), when the incident water wave enters the non-uniform media area the water wave would be scattered (or diffracted) by the structures and the scattered wave would be scattered again to produce the multiple scattering phenomenon. The multiple scattered waves would render constructive interference around the located places of the structures for collecting wave energy. The dispersive wave energy could be aggregated to the located places of the structures, meanwhile the propagation velocity of the waves would be reduced and the amplitude of the wave with higher energy would be enhanced.

Figure 2:
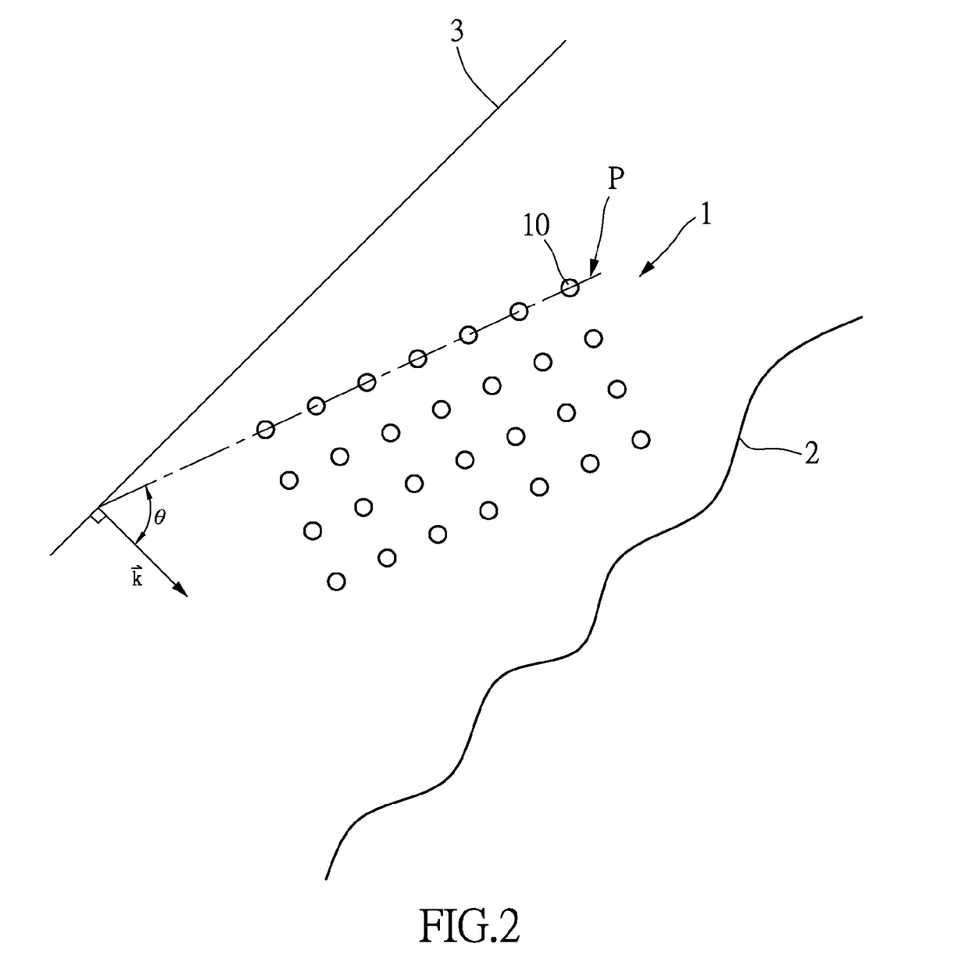
FIG. 2 shows a top-view diagram of a wave energy gathering and enhancing device installed near to the coastline according to an embodiment of the instant disclosure.
Figure 3A:
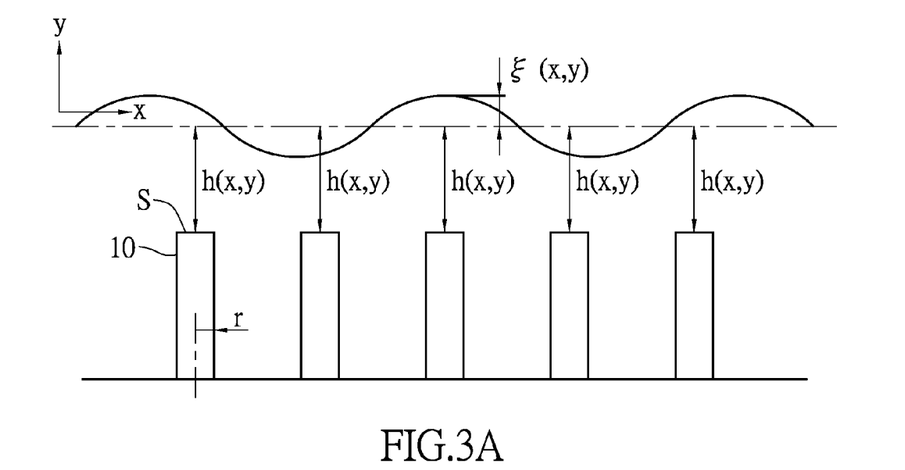
FIG. 3A shows a lateral-view diagram of a wave energy gathering and enhancing device installed below the sea surface according to an embodiment of the instant disclosure.
Figure 3B:
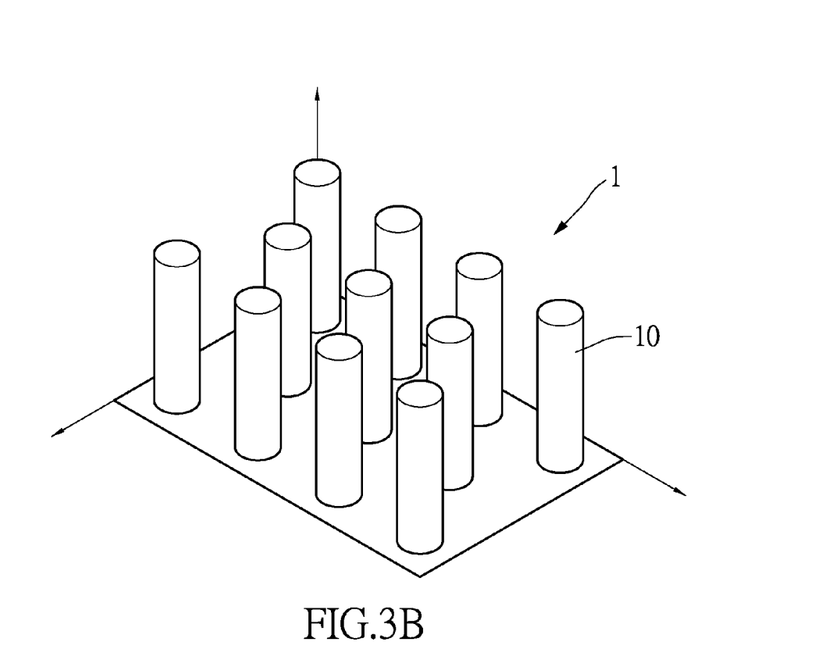
FIG. 3B shows a perspective diagram of a wave energy gathering and enhancing device installed below the sea surface according to an embodiment of the instant disclosure.

Please refer to FIG. 2, FIG. 3A and FIG. 3B. FIG. 2 shows a top-view diagram of a wave energy gathering and enhancing device installed near to the coastline according to an embodiment of the instant disclosure. FIG. 3A and FIG. 3B show a lateral-view diagram and a perspective diagram of a wave energy gathering and enhancing device installed below the sea surface according to an embodiment of the instant disclosure respectively. A wave energy gathering and enhancing device 1 is disposed in a setting area of the sea-bed, and the wavefront 3 of a seawater wave approaches the wave energy gathering and enhancing device 1 with a wave vector "k". The mentioned setting area could be selected according to the situation of the sea-bed around the coastline 2. The wavefront 3 of the seawater wave may have a constant direction, but the present invention is not so restricted. The wave energy gathering and enhancing device 1 comprises a plurality of structures 10. The plurality of structures 10 are arranged below the sea surface in a two-dimensional symmetric discrete group. Each of the structures has a top surface S located below the sea surface with a predetermined depth h (x, y), as shown in FIG. 3. At least an energy converting device (such as the energy converting device 1a and 1b shown in FIG. 1A and FIG. 1B) could be placed above each of the structures 10, but the correspondence of the energy converting device and the structure 10 is not restricted to one to one correspondence.

A lattice with a definite lattice constant (will be described later) is formed by the plurality of structures. A lattice plane P formed by the structures 10 and the wave vector "k" of the seawater wave form an angle θ. The structures 10 enhance the amplitude ξ of the seawater wave above the structures 10 when the seawater wave interacts with and passes through the structures 10.

When the seawater has passed the wave energy gathering and enhancing device 1, a large portion of the wave energy is restricted to the region where the structures 10 are located in. The wave passed the structures 10 carries less energy, thus the wave energy gathering and enhancing device 1 also performs wave attenuation to protect the coastline. In other words, the wave energy gathering and enhancing device 1 gathers the wave energy in the region where the structures 10 are located in. Because the wave energy is mainly in the form of potential energy, increasing the energy density of the wave (enhancing the amplitude of the wave) conducts to promote the availability of wave energy.

Figure 6:
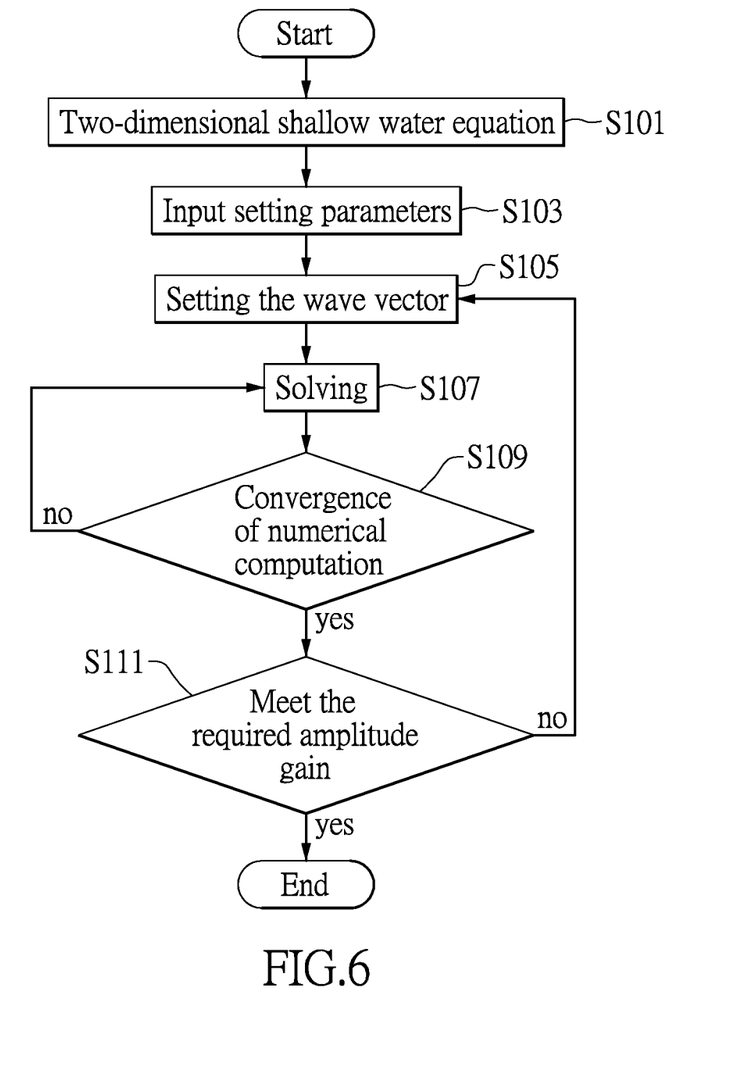
FIG. 6 shows a flow chart of computing parameters of the wave energy gathering and enhancing device according to an embodiment of the instant disclosure.

Please refer to FIG. 3 again. An example of the linearized shallow water equation of the instant disclosure is described as follows:

$$\frac{\partial^2 \xi}{\partial x^2} + \frac{\partial^2 \xi}{\partial y^2} + \frac{1}{h(x,y)} \frac{\partial h(x,y)}{\partial x} \frac{\partial \xi}{\partial y} + \frac{1}{h(x,y)} \frac{\partial h(x,y)}{\partial y} \frac{\partial \xi}{\partial y} + \frac{\omega^2}{gh(x,y)} \xi = 0, \quad (1)$$

wherein h (x, y) is the distance between the top surface S of the structure 10 and the water surface, ξ (x, y) is the amplitude of the wave, ω is the angular frequency of the wave, and "g" is the gravity. When the vector of the wave "k" and the corresponding parameters are determined, the wave amplitude ξ (x, y) could be obtained by solving the shallow water equation (such as the aforementioned equation (1)). Through repeating the calculation of solving the shallow water equation, parameters of the structure 10 corresponding to relatively larger wave amplitude ξ (x, y) could be obtained. The parameters of the structure 10 comprise the lattice constant "a", the distance "h" between the top surface S of the structure and the average water surface, the radius "r" (or the effective radius) of the structure 10. Detail calculation process could be referred to the flow chart shown in FIG. 6 and the corresponding passages.

Figure 4A:
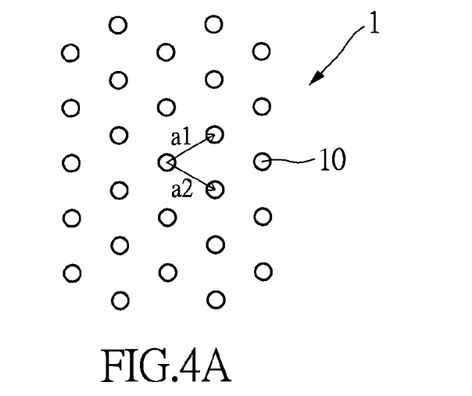
FIG. 4A shows a schematic diagram of a wave energy gathering and enhancing device arranged in the triangular lattice according to an embodiment of the instant disclosure.
Figure 4B:
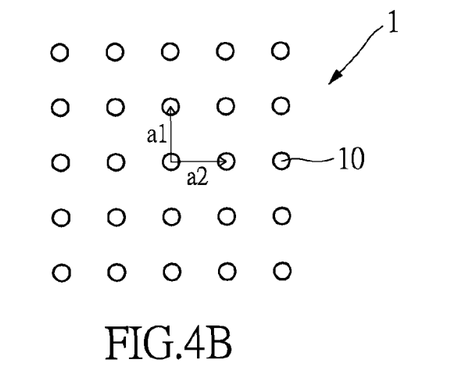
FIG. 4B shows a schematic diagram of a wave energy gathering and enhancing device arranged in the square lattice according to an embodiment of the instant disclosure.
Figure 4C:
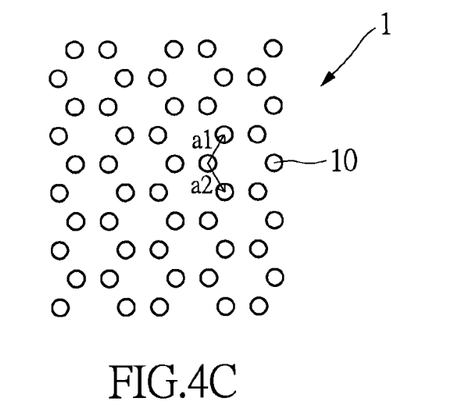
FIG. 4C shows a schematic diagram of a wave energy gathering and enhancing device arranged in the hexagonal lattice according to an embodiment of the instant disclosure.

Please refer to FIG. 4A, FIG. 4B and FIG. 4C. FIG. 4A shows a schematic diagram of a wave energy gathering and enhancing device arranged in the triangular lattice according to an embodiment of the instant disclosure. FIG. 4B shows a schematic diagram of a wave energy gathering and enhancing device arranged in the square lattice according to an embodiment of the instant disclosure. FIG. 4C shows a schematic diagram of a wave energy gathering and enhancing device arranged in the hexagonal lattice according to an embodiment of the instant disclosure. The lattice constant "a" is provided by the periodic arrangement of the structures 10, and $\vec{a}_1, \vec{a}_2$ are unit vectors in the lattice space. The periodic arrangement of the triangular lattice, the square lattice or the hexagonal lattice is just an example of the arrangement in the two-dimensional symmetric discrete group. However, the arrangement of the structures 10 for the instant disclosure does not restricted to the triangular lattice, the square lattice or the hexagonal lattice.

It is worth mentioning that the structures 10 of the embodiment are cylinders for simplifying the calculations. Each of the cylinders has a radius "r", such that the cylinders could simulate a 2-D lattice structure. However, the present invention is not restricted thereto. For example, the structures 10 could be any kind of prisms such as cylinders, rectangular prisms, triangular prisms or hexagonal prisms. Each of the prisms has an effective radius. When the effective radius is obtained, the effective radius could replace the radius of the cylinder for applying the calculations. For actual implementation, the structures 10 could be reinforced concrete columns for example, and the designed structures 10 could be easily installed on the sea-bed by utilizing the existing construction method.

Figures 5A, 5C:
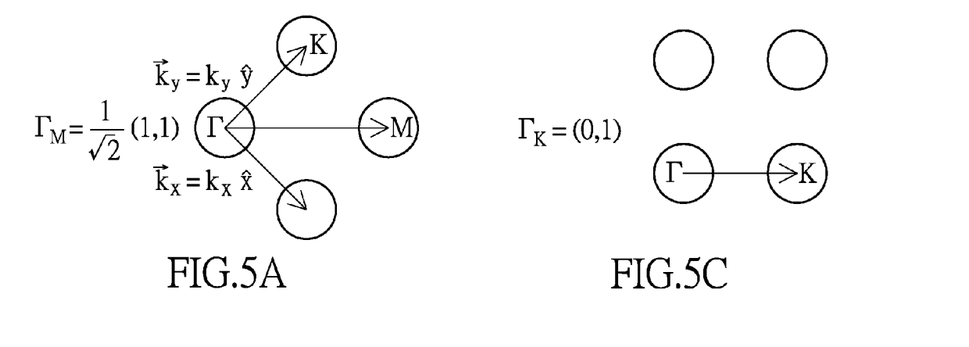
FIG. 5A shows a schematic diagram of a wave incident to the square lattice in a direction from $\Gamma$ point to M point according to an embodiment of the instant disclosure.
FIG. 5C shows a schematic diagram of a wave incident to the square lattice in a direction from $\Gamma$ point to K point according to an embodiment of the instant disclosure.
Figure 5B:
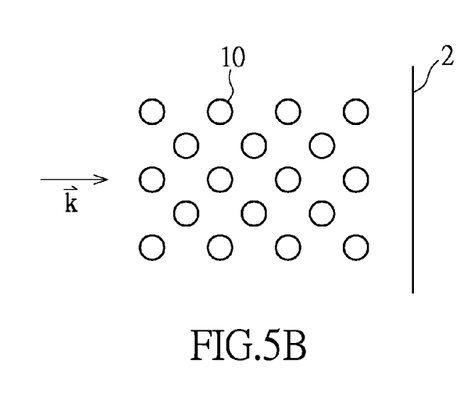
FIG. 5B shows a schematic diagram of a wave incident to the wave energy gathering and enhancing device in the direction from $\Gamma$ point to M point according to an embodiment of the instant disclosure.
Figure 5D:
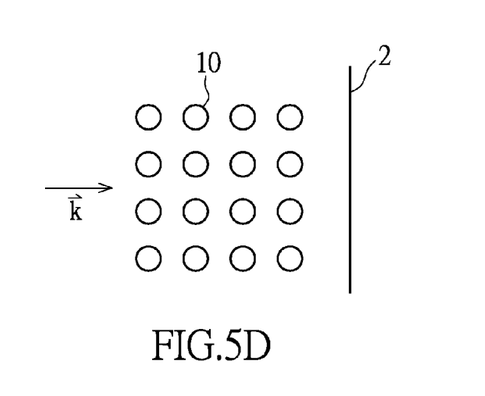
FIG. 5D shows a schematic diagram of a wave incident to the wave energy gathering and enhancing device in the direction from $\Gamma$ point to K point according to an embodiment of the instant disclosure.

Please refer to FIG. 5A, FIG. 5B, FIG. 5C and FIG. 5D. FIG. 5A shows a schematic diagram of a wave incident to the square lattice in a direction from Γ point to M point according to an embodiment of the instant disclosure. FIG. 5B shows a schematic diagram of a wave incident to the wave energy gathering and enhancing device in the direction from Γ point to M point according to an embodiment of the instant disclosure. FIG. 5C shows a schematic diagram of a wave incident to the square lattice in a direction from Γ point to K point according to an embodiment of the instant disclosure. FIG. 5D shows a schematic diagram of a wave incident to the wave energy gathering and enhancing device in the direction from Γ point to K point according to an embodiment of the instant disclosure.

In short, based on the used kind of the 2-D lattice and the angle of the lattice plane P relative to the wave vector "k", the enhanced wave amplitude ξ (x, y) could be obtained by applying parameters (such as the lattice constant "a", the distance "h" between the top surface S of the structures 10 and the averaged water surface and the radius "r" (or effective radius) of the structure 10 itself . . . etc.) to the aforementioned shallow water equation (1). According to the calculation results, the corresponding parameters of the structures 10 with larger wave amplitude could be obtained, thus a most suitable wave energy gathering and enhancing device for use could be designed accordingly.

Please refer to Table 1 listing the wave amplitudes when the structures are cylinders arranged in square lattice, wherein x=h₀/h, y=r/a. The two numbers in each cell are corresponding to the wave amplitude ξ (the number shows the relative value of the enhanced wave amplitude ξ relative to the original wave amplitude) and the product of x and y, respectively. For example, when h₀/h=4 and r/a=0.25, the relative amplitude is 3.1493 (compared to the original wave amplitude), meanwhile the product of x and y is 1.00.

TABLE 1

| r/a | $h_0/h$ | | | | | |
|---|---|---|---|---|---|---|
|  | 2 | 3 | 4 | 5 | 6 | 7 |
| 0.1 | 0.0011 | 0.0017 | 0.0028 | 0.0033 | 0.0042 | 0.0048 |
|  | 0.2 | 0.3 | 0.4 | 0.5 | 0.6 | 0.7 |
| 0.11 | 0.0010 | 0.0019 | 0.0032 | 0.0046 | 0.0059 | 0.0073 |
|  | 0.22 | 0.33 | 0.44 | 0.55 | 0.66 | 0.77 |
| 0.12 | 0.0010 | 0.0014 | 0.0017 | 0.0023 | 0.0034 | 0.0045 |
|  | 0.24 | 0.36 | 0.48 | 0.60 | 0.72 | 0.84 |
| 0.13 | 0.0010 | 0.0019 | 0.0030 | 0.0042 | 0.0053 | 0.0064 |
|  | 0.26 | 0.39 | 0.52 | 0.65 | 0.78 | 0.91 |
| 0.14 | 0.0009 | 0.0015 | 0.0019 | 0.0024 | 0.0031 | 0.0039 |
|  | 0.28 | 0.42 | 0.56 | 0.70 | 0.84 | 0.98 |
| 0.15 | 0.0009 | 0.0018 | 0.0027 | 0.0036 | 0.0043 | 0.0048 |
|  | 0.30 | 0.45 | 0.60 | 0.75 | 0.90 | 1.05 |
| 0.16 | 0.0008 | 0.0012 | 0.0021 | 0.0031 | 0.0040 | 0.0050 |
|  | 0.32 | 0.48 | 0.64 | 0.80 | 0.96 | 1.12 |
| 0.17 | 0.0007 | 0.0011 | 0.0013 | 0.0017 | 0.0023 | 0.0031 |
|  | 0.34 | 0.51 | 0.68 | 0.85 | 1.02 | 1.19 |
| 0.18 | 0.0008 | 0.0009 | 0.0015 | 0.0023 | 0.0033 | 3.9840 |
|  | 0.36 | 0.54 | 0.72 | 0.90 | 1.08 | 1.26 |
| 0.19 | 0.0008 | 0.0013 | 0.0015 | 0.0022 | 0.0039 | 3.9980 |
|  | 0.38 | 0.57 | 0.76 | 0.95 | 1.14 | 1.33 |
| 0.2 | 0.0007 | 0.0015 | 0.0023 | 0.0036 | 3.7343 | 3.9939 |
|  | 0.40 | 0.60 | 0.80 | 1.00 | 1.20 | 1.40 |
| 0.21 | 0.0008 | 0.0012 | 0.0018 | 0.0064 | 3.7294 | 3.9506 |
|  | 0.42 | 0.63 | 0.84 | 1.05 | 1.26 | 1.47 |
| 0.22 | 0.0007 | 0.0014 | 0.0019 | 3.4610 | 3.7082 | 3.9028 |
|  | 0.44 | 0.66 | 0.88 | 1.10 | 1.32 | 1.54 |
| 0.23 | 0.0005 | 0.0008 | 0.0012 | 3.4538 | 3.6819 | 3.8584 |
|  | 0.46 | 0.69 | 0.92 | 1.15 | 1.38 | 1.61 |
| 0.24 | 0.0005 | 0.0008 | 0.0015 | 3.4162 | 3.6088 | 3.7537 |
|  | 0.48 | 0.72 | 0.96 | 1.20 | 1.44 | 1.68 |
| 0.25 | 0.0006 | 0.0007 | 3.1493 | 3.3828 | 3.5550 | 3.6829 |
|  | 0.50 | 0.75 | 1.00 | 1.25 | 1.50 | 1.75 |

Before calculating the parameters of the structures by applying the shallow water equation (1), the water depth disposed with the structures, the range of the average period of the wave, the average wave length and the average wave speed must be known. For example, when the water depth $h_0$=30 m, the range of the average period of the wave is from 5 seconds to 6.5 seconds, the average wave length $\lambda_{30}$ is form 4.485 m to 6.038 m. When the water depth $h_0$=20 m, the range of the average period of the wave is from 4.6 seconds to 5.46 seconds, and the average wave length $\lambda_{20}$ is from 4.05 m to 5.46 m, the average wave speed V is from 0.78 m/s to 1.05 m/s.

Take the square lattice as an example, when the ratio of the water depth ($h_0$) and the depth (h) where the top surface S of the structure is located at is $h_0/h$=4, the ratio of the radius of the cylinder and the lattice constant is r/a=0.25, the maximum enhanced amplitude ξ is 3.1493 (a unitless value, referred to Table 1) and the frequency is 0.59621 (proportional to a/λ).

According to the result of amplitude ξ (unitless) with the maximum value 3.1493, when the water depth $h_0$ is ranges from 20 m to 30 m, the depth (h) of the top surface S is from 5 m to 7.5 m, and the ratio a/λ is 0.59621. When the water depth ($h_0$) is 20 m, lattice constant $a_{20}$=0.59621*(4.05+5.46)/2=2.835 m, and
radius of the structure $r_{20}$=0.25*2.835=0.709 m.

When the water depth ($h_0$) is 30 m, lattice constant $a_{30}$=0.59621*(4.485+6.038)/2=3.137 m, and
radius of the structure $r_{30}$=0.25*3.137=0.784 m.

As can be seen from Table 1, in order to make a larger wave amplitude, the better design is that the product of x and y is between 1 and 1.75, such that 1.00≤xy≤1.75.

Please refer to Table 2 listing the wave amplitudes when the structures are cylinders arranged in the triangular lattice, wherein x=h₀/h, y=r/a. The two numbers in each cell are corresponding to the wave amplitude ξ (unitless) and the product of x and y, respectively. Similarly, take the triangular lattice as another example, when h₀/h=9 and r/a=0.33, the maximum relative amplitude is 3.0501, the frequency is 0.361602 (proportional to a/λ). When the water depth h₀ ranges from 20 m to 30 m, the depth (h) of the top surface S is from 2.22 m to 3.33 m, and the ratio a/λ is 0.361602. Parameters are obtained as follows:

lattice constant $a_{20}$=0.361602*(4.05+5.46)/2=1.719 m;
radius of the structure $r_{20}$=0.25*2.835=0.42975 m;
lattice constant $a_{30}$=0.361602*(4.485+6.038)/2=1.903 m; and
radius of the structure $r_{30}$=0.25*3.137=0.784 m.

As can be seen from Table 2, in order to make a larger wave amplitude, the better design is that the product of x and y is between 1.25 and 4.2, such that 1.25≤xy≤4.2.

Please refer to Table 3 listing the wave amplitudes when the structures are cylinders arranged in the hexagonal lattice, wherein x=$h_0$/h, y=r/a. The two numbers in each cell are corresponding to the wave amplitude ξ (unitless) and the product of x and y, respectively. As can be seen from Table 2, in order to make a larger wave amplitude, the better design is that the product of x and y is between 2.55 and 4.32, such that 2.55≤xy≤4.32.

TABLE 2

| r/a | \multicolumn{11}{c}{$h_0$/h} |
|---|---|---|---|---|---|---|---|---|---|---|---|
| | 2 | 3 | 4 | 5 | 6 | 7 | 8 | 9 | 10 | 11 | 12 |
| 0.1 | 0.9922 | 0.9958 | 1.7129 | 0.9994 | 1.7043 | 1.0017 | 1.6994 | 1.6977 | 1.0032 | 1.0034 | 1.6942 |
|  | 0.20 | 0.30 | 0.40 | 0.5 | 0.6 | 0.7 | 0.8 | 0.9 | 1 | 1.1 | 1.2 |
| 0.11 | 1.7271 | 0.9971 | 1.0005 | 1.6956 | 1.0043 | 1.006 | 1.0073 | 1.0082 | 1.009 | 1.0096 | 1.6741 |
|  | 0.22 | 0.33 | 0.44 | 0.55 | 0.66 | 0.77 | 0.88 | 0.99 | 1.1 | 1.21 | 1.32 |
| 0.12 | 0.9935 | 1.7078 | 1.697 | 1.0046 | 1.6834 | 1.6788 | 1.01 | 1.6718 | 1.6691 | 1.0126 | 1.6649 |
|  | 0.24 | 0.36 | 0.48 | 0.60 | 0.72 | 0.84 | 0.96 | 1.08 | 1.2 | 1.32 | 1.44 |
| 0.13 | 0.9954 | 1.0019 | 1.0063 | 1.0098 | 1.0122 | 1.6724 | 1.0156 | 1.6659 | 1.6633 | 1.0178 | 1.018 |
|  | 0.26 | 0.39 | 0.52 | 0.65 | 0.78 | 0.91 | 1.04 | 1.17 | 1.3 | 1.43 | 1.56 |
| 0.14 | 1.7149 | 1.6933 | 1.6796 | 1.014 | 1.0169 | 1.0189 | 1.0209 | 1.0223 | 1.0228 | 1.0219 | 1.6456 |
|  | 0.28 | 0.42 | 0.56 | 0.70 | 0.84 | 0.98 | 1.12 | 1.26 | 1.4 | 1.54 | 1.68 |
| 0.15 | 0.9976 | 1.6881 | 1.6736 | 1.6633 | 1.6556 | 1.6495 | 1.6447 | 1.6412 | 1.0242 | 0.9976 | 2.3219 |
|  | 0.30 | 0.45 | 0.60 | 0.75 | 0.90 | 1.05 | 1.20 | 1.35 | 1.5 | 1.65 | 1.80 |
| 0.16 | 1.5076 | 1.682 | 1.6677 | 1.0238 | 1.6496 | 1.6431 | 1.0336 | 1.6321 | 4.2707 | 2.2639 | 2.3802 |
|  | 0.32 | 0.48 | 0.64 | 0.80 | 0.96 | 1.12 | 1.28 | 1.44 | 1.6 | 1.76 | 1.92 |
| 0.17 | 1.7024 | 1.0124 | 1.6574 | 1.0268 | 1.0327 | 1.6272 | 1.0403 | 1.0152 | 2.1862 | 4.5957 | 4.7913 |
|  | 0.34 | 0.51 | 0.68 | 0.85 | 1.02 | 1.19 | 1.36 | 1.53 | 1.7 | 1.87 | 2.04 |
| 0.18 | 1.6999 | 1.0152 | 1.6549 | 1.0319 | 1.6327 | 1.0446 | 1.047 | 2.0862 | 4.3995 | 2.2998 | 2.3865 |
|  | 0.36 | 0.54 | 0.72 | 0.90 | 1.08 | 1.26 | 1.44 | 1.62 | 1.8 | 1.98 | 2.16 |
| 0.19 | 1.6953 | 1.0186 | 1.6468 | 1.0405 | 1.6212 | 1.0712 | 3.9669 | 4.1895 | 2.189 | 2.2675 | 4.6647 |
|  | 0.38 | 0.57 | 0.76 | 0.95 | 1.14 | 1.33 | 1.52 | 1.71 | 1.9 | 2.09 | 2.28 |
| 0.2 | 1.004 | 1.0191 | 1.0315 | 1.6231 | 1.0545 | 1.6244 | 1.9874 | 4.1626 | 2.1617 | 4.4548 | 2.2819 |
|  | 0.40 | 0.60 | 0.80 | 1.00 | 1.20 | 1.40 | 1.60 | 1.80 | 2.0 | 2.20 | 2.40 |
| 0.21 | 1.0059 | 1.6579 | 1.0368 | 1.048 | 1.0648 | 3.7399 | 3.9458 | 2.057 | 2.125 | 2.1802 | 4.4506 |
|  | 0.42 | 0.63 | 0.84 | 1.05 | 1.26 | 1.47 | 1.68 | 1.89 | 2.1 | 2.31 | 2.52 |
| 0.22 | 1.0062 | 1.6526 | 1.6304 | 1.6135 | 0.9792 | 3.7204 | 3.8974 | 4.0386 | 4.1515 | 2.1218 | 2.1593 |
|  | 0.44 | 0.66 | 0.88 | 1.10 | 1.32 | 1.54 | 1.76 | 1.98 | 2.2 | 2.42 | 2.64 |
| 0.23 | 1.0064 | 1.65 | 1.6272 | 1.0544 | 3.4939 | 3.697 | 1.9289 | 1.9923 | 2.0424 | 2.0833 | 4.2317 |
|  | 0.46 | 0.69 | 0.92 | 1.15 | 1.38 | 1.61 | 1.84 | 2.07 | 2.3 | 2.53 | 2.76 |
| 0.24 | 1.0073 | 1.0254 | 1.0429 | 1.6041 | 1.7312 | 1.8175 | 3.7681 | 1.9362 | 1.9776 | 4.0201 | 2.0372 |
|  | 0.48 | 0.72 | 0.96 | 1.20 | 1.44 | 1.68 | 1.92 | 2.16 | 2.4 | 2.64 | 2.88 |
| 0.25 | 1.6803 | 1.024 | 1.0419 | 3.2181 | 1.7084 | 3.5665 | 1.8404 | 3.7692 | 1.9194 | 1.9475 | 1.9702 |
|  | 0.50 | 0.75 | 1.00 | 1.25 | 1.50 | 1.75 | 2.00 | 2.25 | 2.5 | 2.75 | 3.00 |
| 0.26 | 1.6793 | 1.0234 | 1.6138 | 1.5953 | 3.3670 | 1.7497 | 3.5995 | 3.6771 | 1.8692 | 1.8939 | 3.8277 |
|  | 0.52 | 0.78 | 1.04 | 1.30 | 1.56 | 1.82 | 2.08 | 2.34 | 2.6 | 2.86 | 3.12 |
| 0.27 | 1.6785 | 1.6397 | 1.0492 | 3.1566 | 3.3145 | 1.7160 | 1.7593 | 3.5858 | 1.8194 | 1.8407 | 1.8581 |
|  | 0.54 | 0.81 | 1.08 | 1.35 | 1.62 | 1.89 | 2.16 | 2.43 | 2.7 | 2.97 | 3.24 |
| 0.28 | 1.0024 | 1.6363 | 1.0491 | 1.5565 | 3.2526 | 3.3548 | 1.7158 | 3.4903 | 1.7684 | 3.5741 | 3.6047 |
|  | 0.56 | 0.84 | 1.12 | 1.40 | 1.68 | 1.96 | 2.24 | 2.52 | 2.8 | 3.08 | 3.36 |
| 0.29 | 1.0003 | 1.6367 | 1.0738 | 1.5268 | 3.1741 | 3.2616 | 3.3270 | 3.3771 | 3.4167 | 3.4485 | 1.7374 |
|  | 0.58 | 0.87 | 1.16 | 1.45 | 1.74 | 2.03 | 2.32 | 2.61 | 2.9 | 3.19 | 3.48 |
| 0.3 | 1.6769 | 1.6341 | 1.4254 | 1.5028 | 1.5568 | 3.1915 | 3.2496 | 1.6472 | 3.3295 | 1.6790 | 1.6906 |
|  | 0.60 | 0.90 | 1.20 | 1.50 | 1.80 | 2.10 | 2.40 | 2.70 | 3.0 | 3.30 | 3.60 |
| 0.31 | 1.6768 | 1.6332 | 1.4114 | 2.9664 | 1.5329 | 1.5687 | 1.5953 | 1.6158 | 3.2639 | 1.6451 | 1.6558 |
|  | 0.62 | 0.93 | 1.24 | 1.55 | 1.86 | 2.17 | 2.48 | 2.79 | 3.1 | 3.41 | 3.72 |
| 0.32 | 1.6782 | 1.0157 | 1.3885 | 1.4521 | 1.4958 | 3.0541 | 1.5505 | 1.5684 | 3.1652 | 1.5941 | 1.6035 |
|  | 0.64 | 0.96 | 1.28 | 1.60 | 1.92 | 2.24 | 2.56 | 2.88 | 3.2 | 3.52 | 3.84 |
| 0.33 | 1.6782 | 1.6310 | 2.7304 | 1.4221 | 1.4608 | 1.4886 | 3.0183 | 3.0501 | 3.0753 | 1.5478 | 1.5563 |
|  | 0.66 | 0.99 | 1.32 | 1.65 | 1.98 | 2.31 | 2.64 | 2.97 | 3.3 | 3.63 | 3.96 |
| 0.34 | 0.9860 | 1.0068 | 2.6896 | 2.7927 | 2.8628 | 2.9130 | 2.9503 | 2.9791 | 3.0020 | 3.0205 | 3.0358 |
|  | 0.68 | 1.02 | 1.36 | 1.70 | 2.04 | 2.38 | 2.72 | 3.06 | 3.4 | 3.74 | 4.08 |
| 0.35 | 1.6808 | 1.0169 | 1.3252 | 1.3721 | 2.8077 | 2.8532 | 1.4436 | 1.4566 | 2.9339 | 2.9508 | 2.9647 |
|  | 0.70 | 1.05 | 1.40 | 1.75 | 2.10 | 2.45 | 2.80 | 3.15 | 3.5 | 3.85 | 4.20 |

TABLE 3

| r/a | \multicolumn{7}{c}{$h_0/h$} | | | | | | |
|---|---|---|---|---|---|---|---|
|  | 12 | 13 | 14 | 15 | 16 | 17 | 18 |
| 0.1 | 1.673 | 1.669 | 1.665 | 1.662 | 1.659 | 1.656 | 1.652 |
|  | 1.2 | 1.3 | 1.41 | 1.5 | 1.6 | 1.7 | 1.8 |
| 0.11 | 1.633 | 1.628 | 1.623 | 1.618 | 1.613 | 1.607 | 1.6 |
|  | 1.32 | 1.43 | 1.54 | 1.65 | 1.76 | 1.87 | 1.98 |
| 0.12 | 1.603 | 1.598 | 1.593 | 1.588 | 1.582 | 1.575 | 1.564 |
|  | 1.44 | 1.56 | 1.68 | 1.80 | 1.92 | 2.04 | 2.16 |
| 0.13 | 1.582 | 1.577 | 1.571 | 1.565 | 1.557 | 1.544 | 1.518 |
|  | 1.56 | 1.69 | 1.82 | 1.95 | 2.08 | 2.21 | 2.34 |
| 0.14 | 1.555 | 1.548 | 1.54 | 1.53 | 1.509 | 1.444 | 2.449 |
|  | 1.68 | 1.82 | 1.96 | 2.10 | 2.24 | 2.38 | 2.52 |
| 0.15 | 1.525 | 1.518 | 1.509 | 1.492 | 1.586 | 3.337 | 3.596 |
|  | 1.80 | 1.95 | 2.10 | 2.25 | 2.40 | 2.55 | 2.70 |
| 0.16 | 1.491 | 1.479 | 1.457 | 1.644 | 3.179 | 3.435 | 3.456 |
|  | 1.92 | 2.08 | 2.24 | 2.40 | 2.56 | 2.72 | 2.88 |
| 0.17 | 1.47 | 1.459 | 1.434 | 2.194 | 3.378 | 3.474 | 3.559 |
|  | 2.04 | 2.21 | 2.38 | 2.55 | 2.72 | 2.89 | 3.06 |
| 0.18 | 1.45 | 1.434 | 1.829 | 3.197 | 3.32 | 3.406 | 3.478 |
|  | 2.16 | 2.34 | 2.52 | 2.70 | 2.88 | 3.06 | 3.24 |
| 0.19 | 1.419 | 1.382 | 2.471 | 3.109 | 2.503 | 3.297 | 3.357 |
|  | 2.28 | 2.47 | 2.66 | 2.85 | 3.04 | 3.23 | 3.42 |
| 0.2 | 1.401 | 1.368 | 2.491 | 3.043 | 3.132 | 3.193 | 3.242 |
|  | 2.40 | 2.60 | 2.80 | 3.00 | 3.20 | 3.40 | 3.60 |
| 0.21 | 1.386 | 1.363 | 1.648 | 2.889 | 3.046 | 3.11 | 3.156 |
|  | 2.52 | 2.73 | 2.94 | 3.15 | 3.36 | 3.57 | 3.78 |
| 0.22 | 1.377 | 1.352 | 2.319 | 2.878 | 2.946 | 2.991 | 3.028 |
|  | 2.64 | 2.86 | 3.08 | 3.30 | 3.52 | 3.74 | 3.96 |
| 0.23 | 1.365 | 1.352 | 1.317 | 2.576 | 2.827 | 2.876 | 2.911 |
|  | 2.76 | 2.99 | 3.22 | 3.45 | 3.68 | 3.91 | 4.14 |
| 0.24 | 1.357 | 1.346 | 1.334 | 1.315 | 1.453 | 2.505 | 2.784 |
|  | 2.88 | 3.12 | 3.36 | 3.60 | 3.84 | 4.08 | 4.32 |
| 0.25 | 1.357 | 1.348 | 1.339 | 1.331 | 1.322 | 1.313 | 1.302 |
|  | 3.00 | 3.25 | 3.50 | 3.75 | 4.00 | 4.25 | 4.50 |
| 0.26 | 1.357 | 1.348 | 1.339 | 1.331 | 1.322 | 1.313 | 1.303 |
|  | 3.12 | 3.38 | 3.64 | 3.90 | 4.16 | 4.42 | 4.68 |
| 0.27 | 1.357 | 1.349 | 1.341 | 1.334 | 1.328 | 1.321 | 1.315 |
|  | 3.24 | 3.51 | 3.78 | 4.05 | 4.32 | 4.59 | 4.86 |
| 0.28 | 1.36 | 1.354 | 1.35 | 1.346 | 1.342 | 1.338 | 1.335 |
|  | 3.36 | 3.64 | 3.92 | 4.20 | 4.48 | 4.76 | 5.04 |
| 0.29 | 1.373 | 1.369 | 1.365 | 1.361 | 1.358 | 1.356 | 1.353 |
|  | 3.48 | 3.77 | 4.06 | 4.35 | 4.64 | 4.93 | 5.22 |
| 0.3 | 1.395 | 1.391 | 1.388 | 1.385 | 1.383 | 1.38 | 1.378 |
|  | 3.60 | 3.90 | 4.20 | 4.50 | 4.80 | 5.10 | 5.40 |
| 0.31 | 1.412 | 1.408 | 1.405 | 1.402 | 1.4 | 1.398 | 1.396 |
|  | 3.72 | 4.03 | 4.34 | 4.65 | 4.96 | 5.27 | 5.58 |
| 0.32 | 1.428 | 1.425 | 1.422 | 1.419 | 1.417 | 1.415 | 1.413 |
|  | 3.84 | 4.16 | 4.48 | 4.80 | 5.12 | 5.44 | 5.76 |
| 0.33 | 1.462 | 1.459 | 1.456 | 1.454 | 1.452 | 1.45 | 1.449 |
|  | 3.96 | 4.29 | 4.62 | 4.95 | 5.28 | 5.61 | 5.94 |
| 0.34 | 1.483 | 1.48 | 1.478 | 1.475 | 1.474 | 1.472 | 1.471 |
|  | 4.08 | 4.42 | 4.76 | 5.10 | 5.44 | 5.78 | 6.12 |
| 0.35 | 1.507 | 1.505 | 1.502 | 1.5 | 1.499 | 1.497 | 1.496 |
|  | 4.20 | 4.55 | 4.90 | 5.25 | 5.60 | 5.95 | 6.3 |

Please refer to FIG. 6 showing a flow chart of computing procedures of the wave energy gathering and enhancing device according to an embodiment of the instant disclosure. Firstly, in the step S101, apply the two-dimensional shallow water equation. In the step S103, input the corresponding parameters comprising the lattice constant "a" and the distance "h" between the top surface S of the structure 10 and the average water surface . . . etc. Then, in the step S105, set the wave vector "k". Then, in the step S107, apply the wave vector "k" to the two-dimensional shallow water equation for solving. Then, in the step S109, confirm whether the numerical calculation is convergent. If the numerical calculation is not convergent, then proceed further calculation until the solution is convergent (i.e. repeating the step S107). If the numerical calculation is convergent, then go to step S111. In the step S111, confirm whether the wave amplitude is satisfied with the desire demand. The purpose of the step S111 is that changing the parameters for finding out another solution with larger enhanced amplitude if the calculated enhanced amplitude is not satisfied with the desire demand. If the calculated enhanced amplitude is not satisfied with the desire demand, then go to the step S105 again to carry out another calculation. When the calculated enhanced amplitude meets the desire demand, the calculation is stopped.

According to above descriptions, the wave energy gathering and enhancing device mainly stores the wave potential energy to obtain more generated electric energy, and increases the energy density of the wave in the energy collection area. The device could be easily integrated with the conventional energy converting system, and it does not need to change the configuration of the existing power generating units. The device has simple construction without moving parts, and has high reliability and low maintenance costs. The device could be a large-scale power plant integrated with electricity generation, breakwater and pier. The device also provides comprehensive utilization of diversification including environmental protection, no consumption of fuel and sightseeing.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A wave energy gathering and enhancing device, disposed in a setting area of the sea-bed, a seawater wave approaches the wave energy gathering and enhancing device with a wave vector, the wave energy gathering and enhancing device comprising:
    a plurality of structures, arranged below the sea surface in a two-dimensional symmetric discrete group, each of the structures having a top surface located below the sea surface with a predetermined depth, a lattice with a definite lattice constant formed by the plurality of structures, a lattice plane formed by the structures and the wave vector of the seawater wave forming an angle, wherein the structures enhance the amplitude of the seawater wave above the structures when the seawater wave interacts with and passes through the structures;
    wherein the plurality of the structures are arranged in one of a square lattice, a equilateral triangular lattice, or a hexagonal lattice;
    when the plurality of the structures are arranged in the square lattice, the ratio (h0/h) of the sea depth and the predetermined depth of the top surface of the structures located below the sea surface is x, the ratio (r/a) of the radius of the cylinder and the lattice constant is y, the product of x and y is between 1 and 1.75, such that $1.00 \leq xy \leq 1.75$;
    when the plurality of the structures are arranged in the equilateral triangular lattice, the ratio (h0/h) of the sea depth and the predetermined depth of the top surface of the structures located below the sea surface is x, the ratio (r/a) of the radius of the cylinder and the lattice constant is y, the product of x and y is between 1.25 and 4.2, such that $1.25 \leq xy \leq 4.2$;
    when the plurality of the structures are arranged in the hexagonal lattice, the ratio (h0/h) of the sea depth and the predetermined depth of the top surface of the structures located below the sea surface is x, the ratio (r/a) of the radius of the cylinder and the lattice constant is y, the product of x and y is between 2.55 and 4.32, such that $2.55 \leq xy \leq 4.32$.

2. The wave energy gathering and enhancing device according to claim 1, wherein the plurality of structures are prisms.

3. The wave energy gathering and enhancing device according to claim 1, wherein the plurality of structures are cylinders, rectangular prisms, triangular prisms or hexagonal prisms.

4. The wave energy gathering and enhancing device according to claim 2, wherein each of the prisms has an effective radius.

5. The wave energy gathering and enhancing device according to claim 2, wherein the plurality of structures are cylinders, each of the cylinders has a radius of the cylinder.

6. The wave energy gathering and enhancing device according to claim 1, wherein a wave energy conversion device is placed above each of the structures.

* * * * *